(No Model.) 5 Sheets—Sheet 2.

G. G. PRENTICE.
MULTIPLE SCREW MACHINE.

No. 574,162. Patented Dec. 29, 1896.

WITNESSES:
F. Philip Farnsworth.
Samuel Alfred Jr.

INVENTOR
George G. Prentice
BY Robinson & Fisher
his ATTORNEYS.

(No Model.) 5 Sheets—Sheet 3.

G. G. PRENTICE.
MULTIPLE SCREW MACHINE.

No. 574,162. Patented Dec. 29, 1896.

WITNESSES:
F. Philip Farnsworth
Samuel Alfred Jr.

INVENTOR
George G. Prentice
BY Robinson & Fisher
his ATTORNEYS.

(No Model.) 5 Sheets—Sheet 4.
G. G. PRENTICE.
MULTIPLE SCREW MACHINE.

No. 574,162. Patented Dec. 29, 1896.

WITNESSES:

INVENTOR
George G. Prentice
BY Robinson & Fisher
his ATTORNEYS.

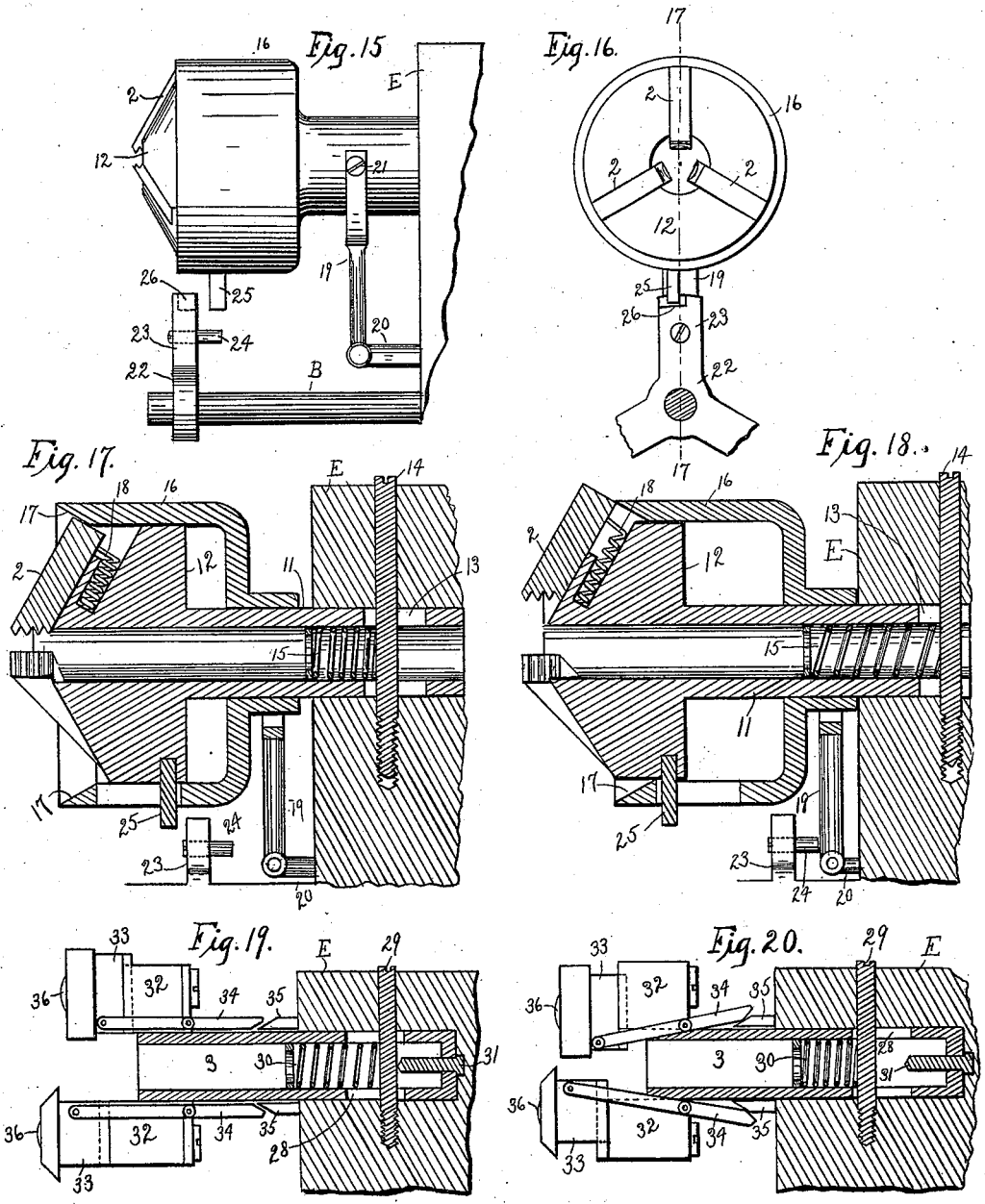

UNITED STATES PATENT OFFICE.

GEORGE G. PRENTICE, OF NEW YORK, N. Y.

MULTIPLE SCREW-MACHINE.

SPECIFICATION forming part of Letters Patent No. 574,162, dated December 29, 1896.

Application filed May 25, 1895. Serial No. 550,660. (No model.)

*To all whom it may concern:*

Be it known that I, GEORGE G. PRENTICE, a citizen of the United States, and a resident of the city, county, and State of New York, have invented a new and useful Improvement in Multiple Screw-Machines, which is fully set forth and described in the following specification, taken in connection with the drawings, which form a part thereof, and in which—

Figure 1:
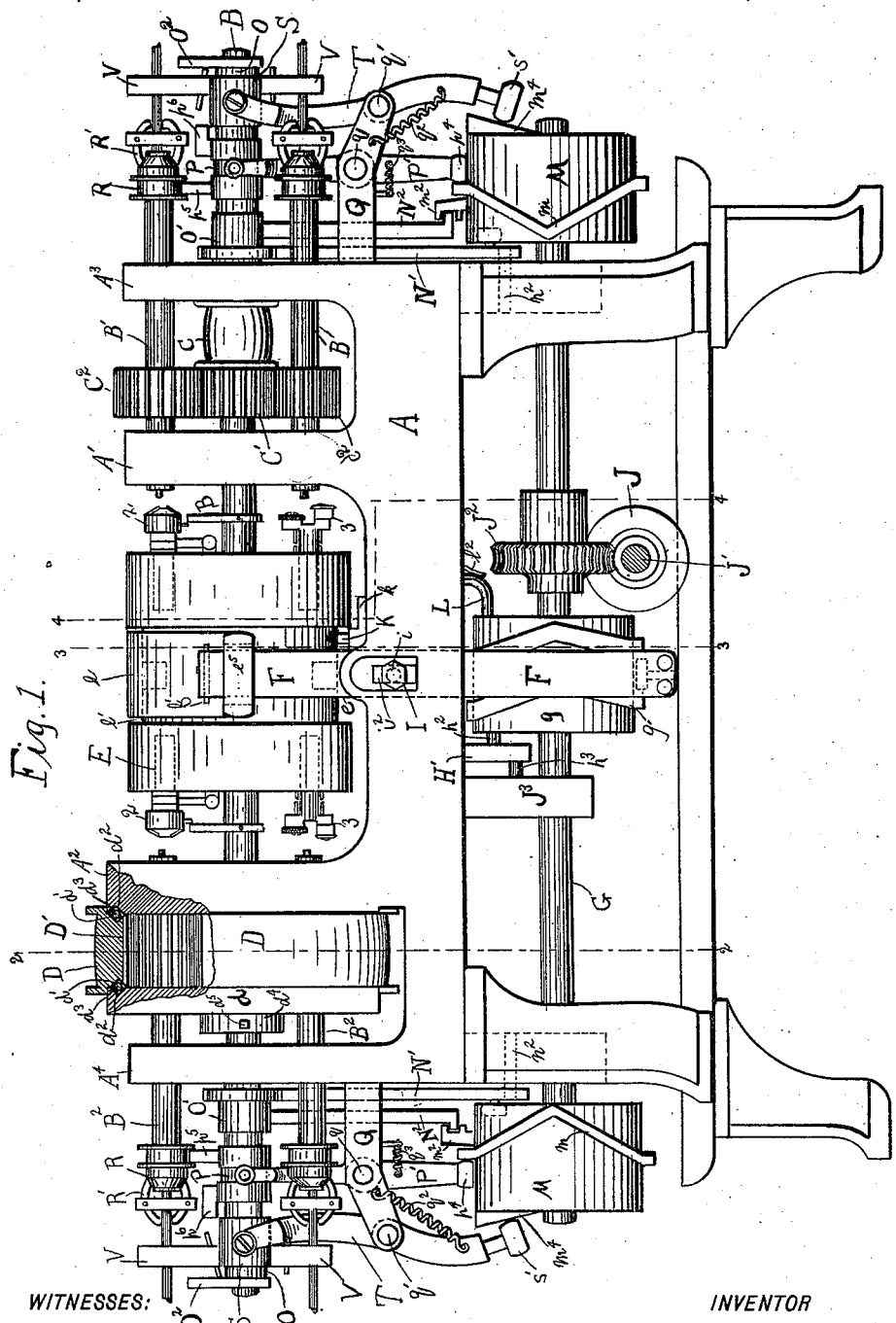
Figure 2:
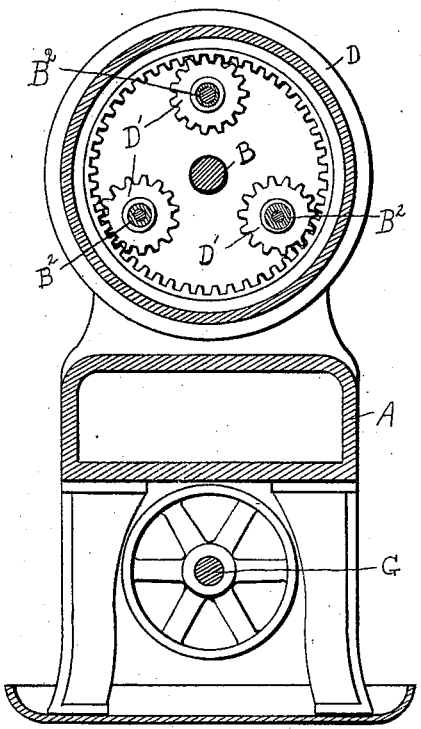
Figure 3:
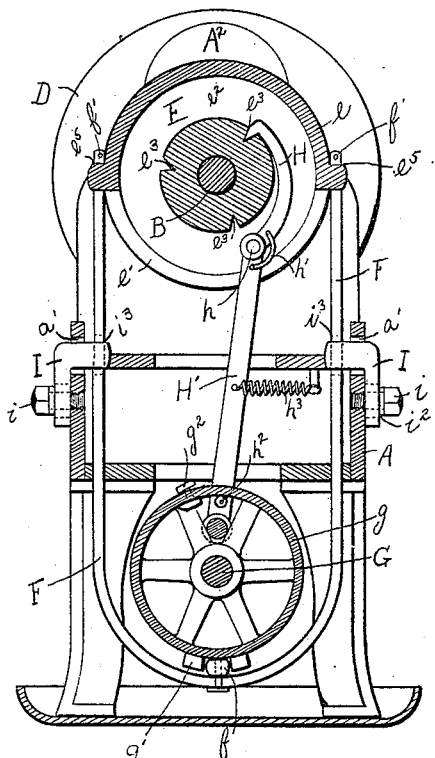
Figure 5:
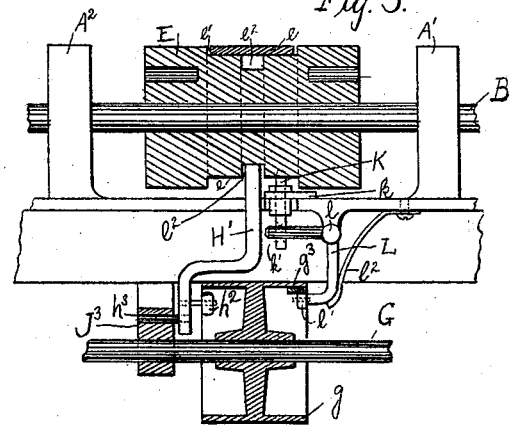
Figure 9:
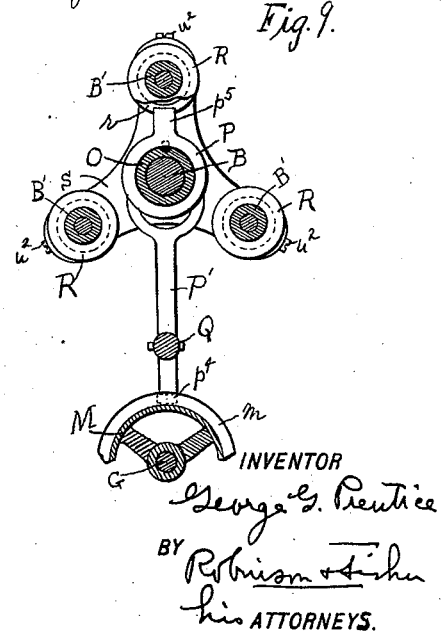
Figure 4:
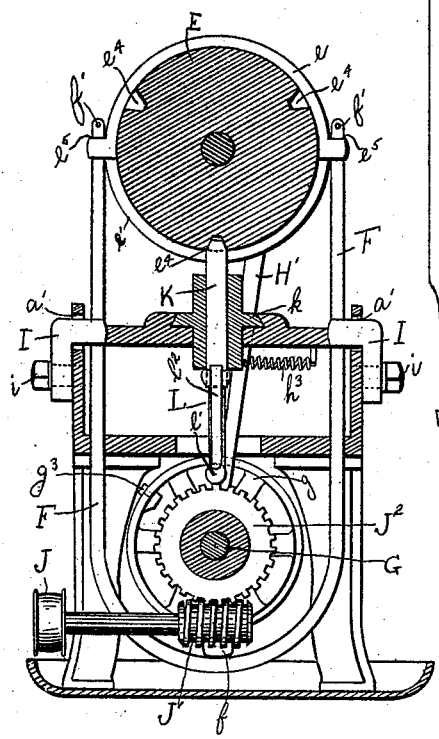
Figure 6:
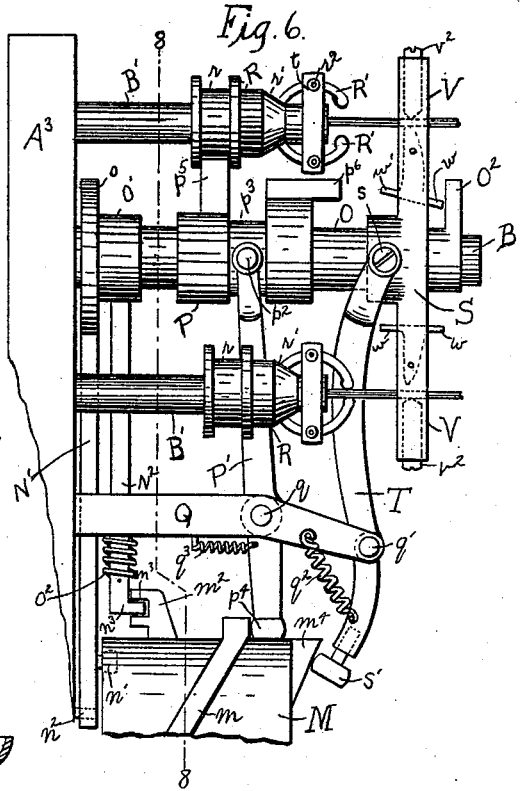
Figure 7:
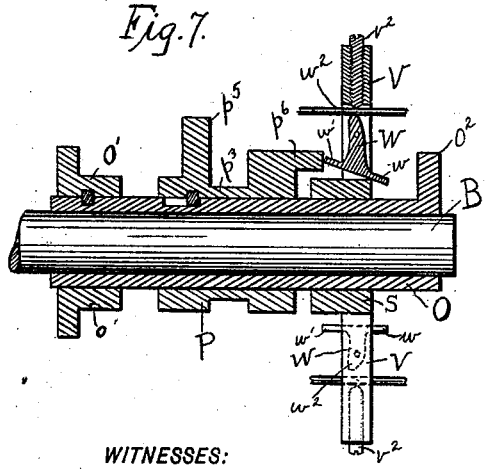
Figure 10:
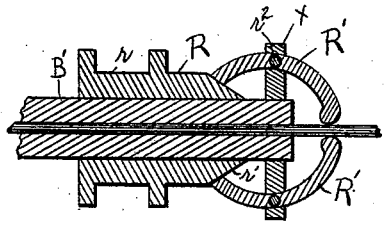
Figure 8:
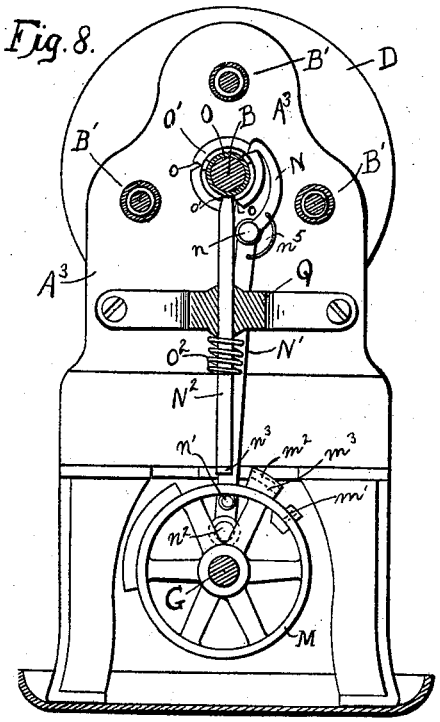
Figure 11:
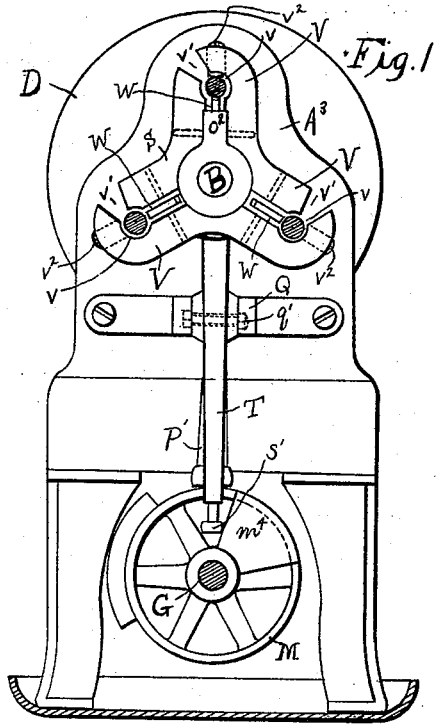
Figure 12:
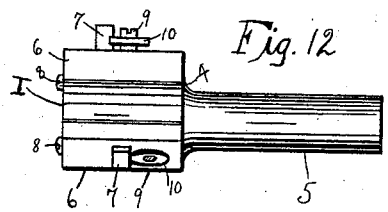
Figure 13:
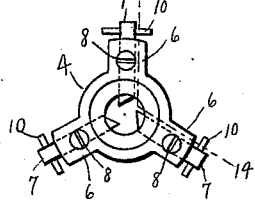
Figure 14:
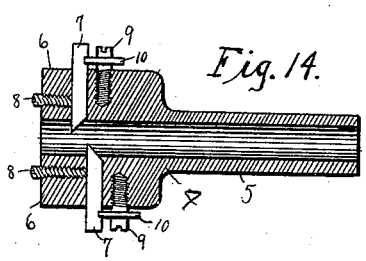

Figure 1 is a side elevation, partly in section, of a screw-machine embodying this invention; Figs. 2, 3, and 4, transverse sectional views on lines 2 2, 3 3, and 4 4 of Fig. 1, respectively; Fig. 5, a longitudinal vertical section through the turret and operating mechanism; Fig. 6, an enlarged elevation of the feed-and-chuck mechanism; Fig. 7, a longitudinal vertical section through the sleeve and collars mounted thereon of the feed-and-chuck mechanism; Fig. 8, a transverse sectional view on lines 8 8 of Fig. 6, looking toward the turret; Fig. 9, a transverse sectional view, partly broken away, on lines 8 8 of Fig. 6, looking toward the end of the machine; Fig. 10, a longitudinal vertical section through the chuck device; Fig. 11, an end elevation of the feeding mechanism; Figs. 12 and 13, side and end elevations, respectively, of the turning-tool; Fig. 14, a longitudinal section of the same on lines 14 14 of Fig. 13; Fig. 15, a side elevation of the threading-tool; Fig. 16, an end elevation of the threading-tool; Figs. 17 and 18, longitudinal sections on lines 17 17 of Fig. 16; Figs. 19 and 20, side views of the combined nurling and cutting-off tool, the shank and part of turret being shown in section.

In all figures the same letters and numerals of reference represent like parts.

This invention relates to lathes for automatically making screws, commonly called "screw-machines," in which the stock is run through revolving spindles to the tools, and has for its objects the construction of a machine having a plurality of spindles, thereby greatly increasing the capacity and efficiency in producing screws, and of the construction of simple driving, feeding, and other mechanisms for a machine of this character, as more fully described and claimed hereinafter.

In the machine embodying this invention and shown in the drawings, A represents the body or bed, with four uprights $A'$, $A^2$, $A^3$, and $A^4$, through which extends longitudinally the dead-shaft B and in which are journaled the two sets of revolving spindles $B'$ and $B^2$ for holding the stock. These spindles are herein shown six in number, three at each end of the machine, extending toward the center; but it is evident that any suitable or desired number may be used by changing the mechanism to correspond thereto.

Two gearings are shown for transmitting power to the spindles by means of a belt from any suitable driving-shaft. One gearing consists of a pulley C, (over which may pass a belt,) mounted to revolve on the dead-shaft B and having rigidly connected thereto a gear $C'$, also mounted on the shaft B. Rigidly-attached gears $C^2$ on the spindles $B'$, meshing with the gear $C'$, transmit the motion of the pulley C to the spindles $B'$. The second gearing, which is an internal gear, is shown driving the other set of spindles, and consists of a pulley D, internally geared to mesh with gears $D'$, rigidly secured on the spindles $B^2$. (See Fig. 2.) On either side of the pulley D are formed circular channels $d'$, angular in cross-section, forming a circular channel with the corresponding grooves $d^2$ on the upright $A^2$ and on a side piece $d$, loosely journaled on the dead-shaft B, so that it may be horizontally adjusted thereon. Within these channels are steel balls $d^3$, forming roller-bearings for the pulley. The side piece $d$, when adjusted to fit properly against the pulley D, is prevented from end motion by the sliding collar $d^4$, mounted on and screwed to the shaft by the pin and set-screw $d^5$. By means of this internal gear a much higher rate of speed may be obtained for driving the spindles than by the external gears driven by pulley C. Either method may be adopted for both sets of spindles, or both may be used, as in the machine described.

Between the central uprights $A'$ and $A^2$ and on the dead-shaft B is loosely mounted the cylindrical turret or tool-holder E, adapted to rotate about said shaft in a vertical plane. The tools 1, 2, and 3 (more fully described hereinafter) are set in sockets in the faces of the turret E and are presented successively to the stock in the spindles upon the rotation of the turret, both faces of the turret having like tools. As the stock is presented to the turret from both ends of the machine, the turret is reciprocated from end to end, bringing the tools alternately in contact with the stock in either set of spindles. This double movement of the turret, that is, rotary and reciprocating, is accomplished by the mechanism now to be described.

Power from any suitable driving-shaft is transmitted by means of a pulley J, worm-shaft J', connected therewith, and a gear $J^2$, rigidly secured to the shaft G, which extends longitudinally through and is journaled in the bed A. Upon the shaft G and under the turret E is rigidly mounted a drum or cam-wheel $g$, having the cam $g'$ on its outer surface.

On the bed A of the machine, admitted through the openings $a'$, are angular shoulders I. A screw-bolt $i$, passing through a vertically-extending slot $i^2$ in the lower or vertical part of the shoulder I, Figs. 3 and 4, secures it to the bed A, and the shoulder I has a limited adjustment thereon. In the upper or horizontal portion of the shoulder I is a slot $i^3$, through which an operating-lever F passes downward about the cam-wheel $g$, the upper ends of which are tangent to the turret E. The operating-lever F is secured to the turret E by means of a semicircular band or shell $e$, which rests in an annular groove $e'$ about the center of the cylindrical surface of the turret and to which the lever F is connected by the eyes $e^5$ and pins $f'$. By this connection between the band $e$ and turret E the horizontal or reciprocating movement of the turret is controlled by the lever F; but at the same time rotary movement is allowed the turret independent of the lever. At the bottom of the operating-lever is a horizontal roller $f$, adapted to bear against the cam $g'$ of the cam-wheel $g$. Upon the rotation of the cam-wheel $g$ the cam $g'$, by means of its angular form bearing against the roller $f$, oscillates the lower end of the operating-lever F. The lever F, being pivoted to the bed by the shoulders I and connected to the turret E by the band $e$, forces the turret to and from either set of spindles as the lower end of the lever is oscillated by the cam $g'$. In the center of the groove $e'$ of the turret is a narrower deeper groove $e^2$, notched at the three points $e^3$ to form a dial-wheel, the notches $e^3$ being the teeth. Against this dial-wheel abuts the pawl H, adapted to engage with the teeth $e^3$ and pivotally connected at $h$ with an oscillating lever H', Fig. 3. A spring $h'$, bearing against the pawl H, holds it constantly in contact with the dial-wheel. The lever H', of the form shown in Fig. 5, is pivotally connected by bolts $h^3$ or otherwise to the bearings $J^3$, loosely mounted on the cam-shaft G. A tripper $g^2$ on the interior of the cam-wheel $g$ is adapted to come in contact with a roller $h^2$ on the lever H' upon the revolution of the cam-wheel $g$. When the tripper $g^2$ engages with the roller $h^2$, it draws the lever H' about its center, and the pawl H, connected to the lever, revolves the turret E by its engagement with a notch of the dial-wheel. As the lever H' has a center above that of the cam-wheel $g$ when it has been drawn through an arc sufficient to revolve the turret one-third of a circle, the tripper $g^2$ will pass over the roller $h^2$, allowing the lever to swing back under the tension of spring $h^3$ and the pawl to engage in the next notch of the dial-wheel. The teeth of the dial-wheel are so arranged that the tools in the turret will be in proper alinement with the spindles when the lever and pawl are in their normal positions.

The turret E is held in its proper alinement and from revolving by means of a lock-bolt K, which is shot into sockets or keepers $e^4$, formed in the turret. The bolt K has a vertical play in the traveler $k$, which is dovetailed in the bed A of the machine to slide horizontally as the turret reciprocates between the two sets of spindles, Figs. 4 and 5. A bell-crank lever L, pivoted at $l$ to the bed A, shoots the bolt K into and withdraws it from the sockets $e^4$ in the turret. One end of the lever $l$ projects through the horizontal slot $k'$ into the bolt K, and against the other end bears the spring $l^2$, tending to force the lever and bolt upward. To the lower end of the lever is attached a roller $l'$, adapted to be engaged by the tripper $g^3$ on the interior of the cam-wheel $g$. When the turret is to be revolved by the pawl H, the tripper $g^3$ on the cam-wheel $g$, coming in contact with the roller $l'$ of the bell-crank lever L, forces the end of the lever downward, which in turn withdraws the bolt from its socket $e^4$. The tripper $g^3$ having passed over the roller $l'$, the bolt K is at liberty to engage in the next socket upon the revolution of the turret E.

The operation of the machine, which is fed with wire through the spindles B' and $B^2$, is as follows: The rotation of the cam-shaft G revolves the cam-wheel $g$, which, as described above, oscillates the lower end of the lever F. As the lower part of the lever is drawn toward the right end of the machine, Fig. 1, the upper part forces the turret toward the left end of the machine and presses the tools on the left face of the turret against the stock in the spindles $B^2$. The revolving stock in the spindles $B^2$ engages with the tools in alinement therewith, and the three operations of turning, threading, and nurling and cutting off are performed simultaneously on the stock in the three spindles. When these operations are completed, the cam $g'$ on the cam-wheel $g$ forces the lower end of lever F toward the left, and the turret is thereby drawn away from the spindles $B^2$ toward the stock in the right-hand spindles B', and this stock is acted upon in like manner. Upon the completion of the operation on the stock in the right-hand spindles the cam $g'$ on the cam-wheel $g$, by means of the lever F, draws the turret away from the spindles B'. At this point the tripper $g^3$ on the cam-wheel $g$ comes in contact with the roller $l'$ on the bell-crank lever L, which withdraws the bolt K from its socket, as shown above. Immediately the tripper $g^2$, also on the cam-wheel $g$, strikes the roller $h^2$ on the lever H', which operates the pawl H to rotate the turret until the bolt K shoots into the next socket $e^4$, which allows the turret to be rotated through one-third of a circle to move each tool forward to the next succeeding spindle and in alinement with the stock in the spindle. Further rotation of the cam-wheel $g$ by means of the cam $g'$ and lever F forces the turret to the left, and the operation is repeated. The lever H' is released from engagement with the tripper $g^2$, as shown above, and the pawl H thereupon allowed to engage with the next succeeding notch $e^3$ on the dial-wheel.

The feed mechanism is shown the same at both ends of the machine and is driven by cam-wheels M, rigidly secured on the cam-shaft G, extending beyond the outside uprights $A^3$ and $A^4$. A sleeve O, loosely mounted on the dead-shaft B, has a rigid collar O', one end of which is notched at three points $o$ to form a dial-wheel, the teeth of which are the notches $o$. A pawl N abuts the dial-wheel and is pressed into engagement by a spring $n^5$, Fig. 8. The pawl N is pivotally connected at $n$ with an oscillating lever N', the lower end of which is journaled on a short shaft or arbor $n^2$, projecting from the bed A of the machine above the cam-shaft G. A roller $n'$ on the lever N' is adapted to come into engagement with a tripper $m'$ on the interior of the cam-wheel M, and the operation of rotating the sleeve O by the dial-wheel O', pawl N, and lever N' resembles that shown above in rotating the turret E. A lock-bolt $N^2$, for holding the sleeve from rotation, shoots into sockets $o'$ in the collar O' and is held in place by a spring, such as $o^2$, Fig. 6. To withdraw the bolt $N^2$ to rotate the sleeve O, a cam $m^2$ on the surface of the cam-wheel M is provided with a flange $m^3$, curved inward toward the cam-wheel, as shown in Figs. 6 and 8, which engages with a horizontal lug $n^3$ on the lower end of the bolt $N^2$. The flange $m^3$ of the cam $m^2$, passing over the lug $n^3$, draws the bolt $N^2$ downward toward the wheel, overcoming the tension of spring $o^2$, Fig. 6, until the bolt is withdrawn from its socket. At this point the pawl rotates the sleeve O, and the bolt, released from engagement with the cam $m^2$, upon the further revolution of the cam-wheel M is at liberty to shoot into the next succeeding socket on the collar O' when it comes into alinement therewith. A second collar S, loosely mounted on the sleeve O, is operated by a lever T, pivoted at $q'$ to an extension-arm Q, projecting from the bed A, the lever being forked to surround the collar S, to which it is secured by screws $s$. A roller $s'$ on the lower end of the lever T is adapted to come in contact with the triangular-shaped cam $m^4$ upon the revolution of the cam-wheel M. The cam $m^4$ gradually forces the lower end of the lever away from the cam-wheel M, and the upper end of the lever simultaneously draws the collar S in the opposite direction. As the cam $m^4$ passes beyond the roller $s'$ by means of the spring connection $q^2$ between the lever T and extension-arm Q the lever moves backward, and the movement of the collar S is reversed. On the collar S are the three arms V, having circular perforations $v$ (with mouths $v'$ into the same) in alinement with the three spindles B'. The screws $v^2$ extend from the extremity of the arms V into the perforations $v$ to partially bind the stock in the perforations. The feeding device consists of three friction-clutches W, pivoted in the arms V, having two studs $w$ and $w'$ projecting in either direction. The portion of the clutch above the point at which it is pivoted is of eccentric shape, as shown, having the larger part toward the center of the machine. On the extremity of the sleeve O is a small arbor $O^2$, against which may abut the projection $w$ of the clutch W, thereby forcing the part $w^2$ upward against the stock, as shown in Figs. 6 and 7, which is placed in the perforations $v$ in the arms V opposite the spindles B' in the form of wire rod. Upon the revolution of the cam-shaft G and cam-wheel M the lever T forces the collar S to the end of the sleeve O, and, the projecting end $w$ of the clutch W coming in contact with the arbor $O^2$, the clutch is turned so that the stock is securely held between the part $w^2$ and the screw $v^2$, as shown in dotted lines, Fig. 6. Upon further rotation of the cam-wheel M and cam $m^4$ the lever T forces toward the spindle B' the collar S with the stock still held in the friction-clutch, thus feeding it the desired distance into the spindle. When the stock has been fed sufficiently into the spindle, the projecting end $w'$ of the friction-clutch W comes into contact with the abutment $p^6$ (see Fig. 7) on the collar P, (described hereinafter,) turning the clutch W to release the stock. The cam $m^2$ thereupon withdraws the bolt $N^2$ from its socket, and the sleeve O is rotated by the tripper $m'$, lever N', and pawl N to bring the arbor $O^2$ opposite to the next succeeding arm V of collar S to feed the spindle in alinement therewith.

It is evident that the operation of feeding the stock into the spindle follows the operation of the cutting-off tool on each spindle.

The chuck or device for holding the stock securely in the spindles consists of friction-arms R', pivoted at $r^2$ to sleeves $x$, which are screwed onto the ends of the spindles. Split collets R, loosely mounted on the spindles, are beveled at their outer ends to form a conical surface $r'$, engaging and forcing apart the inner ends of the friction-arms R', and when so engaging the inner ends the outer or free ends of the arms R' are adapted to engage and securely hold the stock. This mechanism is controlled and operated by a third collar P on the sleeve O, spined thereto to allow it to slide longitudinally thereon, while requiring it to revolve with the sleeve O, Fig. 7. An oscillating lever P', pivoted at $q$ to the extension-arm Q, is forked to surround the collar P, and has screws or rollers $p^2$, which fit into a circular groove $p^3$ in the collar P and control the longitudinal movement of the collar, while allowing it an independent rotary motion. The lower end of the lever P' has a roller $p^4$, which abuts against the angular cam $m$ on the cam-wheel M, against which it is held by spring $q^3$. By means of this cam $m$ the lower end of the lever P' is oscillated and the upper end in its engagement in the groove $p^3$ reciprocates the collar P in the reverse direction. An arm $p^5$ on the collar P is adapted to engage in grooves $r$ in the split collets R, and as the collar P is reciprocated forces the collet R from and toward the friction-arms R'.

Previous to the action of the feeding mechanism the collar P is reciprocated and the collet R drawn away from the friction-arms R', thereby releasing the stock between the free ends of the arms R', as shown in the collet on the upper spindle, Fig. 6. The wire having been fed into the spindles, the movement of the collar P is reversed and the collet R forced between the friction-arms R' to secure the wire, as before. The same third of a revolution of the sleeve O which brings the arbor O² in position for the feeding of the wire into the next succeeding spindle moves the arm $p^5$ into engagement with the collet on the spindle. The oscillation of the lever P' and of the lever T by the cam-wheel M will thereupon repeat the operation.

The tool 1 (shown in Figs. 12 to 14) is a turning tool, and consists of a head 4 and shank 5, which fits into a socket in the turret E. The head 4 of the tool has the three arms 6, slotted transversely to receive the dies 7. Screws 8 extend longitudinally through the body of the tool, securing the dies 7, and transverse screws 9, with disks 10 engaging in grooves in the dies, adjust the depth of the cut.

The threading-tool 2 has a long shank 11 with a head 12. The shank fits into the hollow socket in the turret E and has a vertical slot 13, through which projects a screw 14 for a coiled spring 15, which connects the shank and screw and tends to draw the shank inward. A hollow sleeve 16 surrounds the head and outer portion of the shank, having its inner edge beveled at 17. The threading-dies are fitted into the head 12 and are connected with the springs 18, tending to draw the dies outward. These dies are adapted to slide in the head 12 on a line forming an angle with the perpendicular equivalent to the angle of the thread to be cut.

A forked lever 19, pivoted to a short arbor 20 on the turret, is connected by the screws or pins 21 to the sleeve 16. A three-armed collar 22 is mounted on the dead-shaft B, so that the arms are in alinement with the spindles. In the arm 23 is the lug 24, against which the lever 19 will come in contact with the forward movement of the turret E. The turret being moved toward the spindles, the revolving stock engages the teeth of the threading-dies, and gradually as the thread is cut the shank 11 is drawn outward against the tension of the spring 15. The dies are held in engagement with the stock by the beveled edges 17 of the sleeve 16, Fig. 17, until the lever 19 comes in contact with the lug 24, (which is adjusted to take place when the shoulder of the screw is reached,) and the sleeve 16 is forced thereby toward the turret, releasing the dies, which fly outward under the pressure of the springs 18 at an angle equivalent to the pitch of the thread, as shown in Fig. 18. By this angle of the dies the thread may be cut close to the shoulder of the screw. Immediately that the dies are released from engagement with the stock the coiled spring 15 draws the head backward toward the turret into the sleeve 16. In case further pressure is necessary to force the dies within the beveled edges 17 of the sleeve 16 the end of the arm 23 is beveled in a vertical plane at 26, so that on the rotation of the turret E to bring the tool in alinement with the next succeeding spindle the vertical pin 25 in the head 12 will come in contact with the beveled surface 26 and be drawn rearward, forcing the head and dies within the sleeve 16.

The combined nurling and cutting-off tool (shown in Figs. 19 and 20) consists of a hollow shank 3, which fits into the socket of the turret E, with the vertical slot 28, through which extends the screw 29. A spiral spring 30 in the interior of the shank 3 is connected therewith and abuts against the screw 29. A screw 31 limits the forward movement of the shank by contact with the vertical screw 29. The head 32 of the tool is divided into two parts and the sliding carriages 33 are vertically dovetailed therein to permit a vertical movement. Pivoted to the heads are the levers 34, the forward ends of which are pivoted to the tool-carriages. The rear ends are beveled to engage with the beveled surfaces of the blocks 35, secured to the turret E. The nurling and cutting-off dies are mounted on the forward ends of the carriages by means of the screws 36. As the stock comes in contact with the tool the shank is gradually forced backward into the socket, overcoming the tension of the spring 30. The levers 34 being forced rearward, coming in contact with the beveled surfaces of the blocks 35, draw the carriages inward until the screw is severed from the stock, as shown in Fig. 20. Upon the movement of the turret away from the stock the spring 30 forces the shank outward, and the tool is again ready for operation.

Having now described this invention, which may be modified in construction without departing from the spirit of the invention, what I claim is—

1. A multiple screw-machine consisting of a turret having tools mounted on opposite faces thereof; devices for holding stock on opposite sides of said turret; and means for reciprocating said turret between said stock-holding devices to bring the tools alternately into operation on said stock, substantially as described.

2. The combination in a screw-machine with two sets of horizontal revolving spindles for holding the stock; of a turret adapted to reciprocate and bring tools alternately into operation with the two sets of spindles; and means for reciprocating said turret, substantially as described.

3. A multiple screw-machine consisting of a turret having a set of tools mounted on opposite faces thereof; devices for holding stock on opposite sides of said turret; means for reciprocating said turret between said stock-holding devices to bring the tools alternately into operation on said stock; said turret being capable of an intermittent rotary movement to bring the tools of each set successively into operation upon the stock carried by the devices on the same side of said tool-holder; and mechanism for operating said turret, substantially as described.

4. A multiple screw-machine consisting of a turret having a set of tools mounted on opposite faces thereof; two sets of a plurality of revolving spindles for holding stock on opposite sides of said turret; said turret having a reciprocating movement to bring tools alternately into operation with the two sets of spindles, and an intermittent rotary movement about an axis parallel to said spindles to bring the tools of each set successively into operation with the spindles of the set on the same side of the turret; and mechanism for operating said turret and revolving said spindles, substantially as described.

5. A multiple screw-machine consisting of a tool-holder, with sets of tools on two faces thereof; two sets of revolving spindles for holding the stock and presenting it to the two sets of tools on the tool-holder, each spindle corresponding to a tool; devices for holding the stock in each spindle; mechanism for feeding the stock into each spindle in a set successively; and mechanism for rotating said tool-holder and for reciprocating the same between said two sets of spindles, said feed mechanism and rotating and reciprocating mechanism being operated from the same driving-shaft, substantially as described.

6. In a screw-machine the combination with uprights; of a series of parallel spindles mounted to revolve in said uprights; a pulley surrounding said spindles, being internally geared to mesh with gears on said spindles; an adjustable plate mounted on a shaft parallel to the axis of said pulley; said pulley, upright, and adjustable plate being provided with corresponding channels for ball-bearings, substantially as described.

7. In a screw-machine the combination with the lathe-bed; of a tool-holder mounted on a horizontal shaft, said tool-holder having a centrally-disposed annular groove; a semi-circular band adapted to fit in said annular groove; a lever pivoted to said band and to said lathe-bed; and mechanism for oscillating said lever, substantially as described.

8. In a screw-machine the combination with two sets of spindles; of a driving-shaft, having a cam-wheel mounted thereon; an oscillating lever operated by cams on said cam-wheel; and a tool-holder having tools in both ends thereof brought alternately into operation with said two sets of spindles by said oscillating lever, substantially as described.

9. In a screw-machine, the combination with the bed thereof; of two sets of spindles; a tool-holder having tools on both ends thereof and capable of a reciprocating motion; a driving-shaft having a cam-wheel mounted thereon; a lever pivoted on the bed to be oscillated by cams on said cam-wheel, said lever being connected to said tool-holder to reciprocate the same between the two sets of spindles to bring the tools alternately into operation on stock in said two sets of spindles, said tool-holder having a rotary motion independent of said lever, substantially as described.

10. In a screw-machine, the combination with a series of parallel spindles; of a tool-holder mounted on a shaft parallel to said spindles; a driving-shaft having a cam-wheel mounted thereon; a lever swung from a center above the driving-shaft; a tripper on said cam-wheel adapted to engage with said lever during a part of the revolution of said cam-wheel; and a pawl pivoted to the free end of said lever to engage with and rotate said tool-holder, substantially as described.

11. In a screw-machine, the combination with a driving-shaft; of a cam-wheel; two levers operated by said cam-wheel, one of said levers having a pawl connected therewith; a turret reciprocated by one of said levers and rotated by the other lever and pawl, and having tools on both ends; and two sets of parallel spindles presenting stock to both ends of said turret, substantially as described.

12. In a screw-machine, the combination with the bed thereof; of a tool-holder capable of a rotary and reciprocating motion; of a lock-bolt to hold said tool-holder against rotation, carried in a traveler dovetailed in the bed, to slide longitudinally when said tool-holder is reciprocated; a driving-shaft having a cam-wheel mounted thereon; and a lever connected with said lock-bolt to operate the same upon the engagement therewith of a tripper on said cam-wheel, substantially as described.

13. In a screw-machine, the combination with a tool-holder, capable of a rotary and reciprocating motion; of a lock-bolt adapted to hold said tool-holder against rotation, and carried on a traveler capable of a longitudinal motion when said tool-holder is reciprocated; a bell-crank lever pivoted to said lathe-bed, and having one end substantially at right angles to said lock-bolt, and extending through a slot in the same; and mechanism for operating said lever, substantially as described.

14. In a screw-machine, the combination with a series of parallel revolving spindles; of devices for holding wire or rods in said spindles; reciprocating feed mechanism in alinement with each spindle; mechanism mounted to rotate on an axis parallel to said spindles, against which said feed mechanism for each spindle is adapted to come in contact successively upon the reciprocation thereof, substantially as described.

15. In a screw-machine, the combination with a series of parallel revolving spindles; of devices for holding wire or rods in said spindles; a reciprocating collar mounted on a shaft parallel to said spindles, carrying feed mechanism in alinement with each spindle; and a rotary sleeve carrying devices adapted to engage with and operate the feed mechanism for each spindle successively, substantially as described.

16. In a screw-machine, the combination with a series of spindles; of a reciprocating collar having arms in alinement with each spindle; and a friction-clutch in each arm adapted to feed stock into said spindles upon the reciprocation of the collar, substantially as described.

17. In a screw-machine, the combination with a series of parallel spindles; of devices for holding the wire or rods in said spindle; a reciprocating collar mounted on a shaft parallel to said spindles having arms in alinement with each spindle; a friction-clutch in each arm adapted to engage with the stock; rotary sleeves mounted on said shaft parallel to said spindles, carrying arbors adapted to come in contact with said clutches successively to engage and disengage the same with the stock, substantially as described.

18. In a screw-machine, a feeding device consisting of a reciprocating arm having a perforation therein, and a friction-clutch pivoted in said arm, and having an enlarged portion adapted to be swung about the pivot by contact-pieces upon the reciprocation of said arm, substantially as described.

19. In a screw-machine, a feeding device, consisting of a reciprocating piece; a binding-screw in said piece; a friction-clutch pivoted in said piece having an enlarged portion adapted to engage stock with said screw when said clutch is turned on its pivot; and mechanism for reciprocating said piece and turning said clutch upon its pivot, substantially as described.

20. In a screw-machine, the combination with a series of parallel spindles; of devices on said spindles for holding the stock therein; reciprocating mechanism for feeding stock into said spindles; a reciprocating sleeve mounted on a shaft parallel to said spindles for operating said holding devices; and a rotary sleeve mounted on said shaft to connect said reciprocating sleeve with the holding device and to operate said feed mechanism for each spindle successively, substantially as described.

21. In a screw-machine, the combination with a series of parallel revolving spindles having friction-arms pivoted at the ends thereof, the outer ends of which are adapted to engage with the stock, and loosely-mounted collets beveled at their outer ends to wedge between the inner ends of said friction-arms; and mechanism for reciprocating said collets in succession, substantially as described.

22. In a screw-machine, the combination with a series of parallel revolving spindles having friction-arms pivoted at the ends thereof, and loosely-mounted collets beveled at one end to wedge between the inner ends of said friction-arms; of a rotary and reciprocating sleeve mounted on a shaft parallel to said spindles adapted to engage with the collets in succession to reciprocate the same, substantially as described.

23. In a screw-machine, the combination with a series of parallel spindles; of devices for holding the stock in said spindles; a sleeve mounted on a shaft parallel to said spindles, capable of a rotary motion to engage successively with the holding device on each spindle, and of a reciprocating motion to operate the holding device engaged therewith; and mechanism for operating said sleeve, substantially as described.

24. In a screw-machine, the combination with a series of parallel spindles; of devices for holding the stock in said spindles; a rotary and reciprocating sleeve mounted on a shaft parallel to said spindles having an arm adapted to engage successively with the holding devices on each spindle, and to operate the device so engaged, substantially as described.

25. In a screw-machine, the combination with a tool-holder; of a head having mounted therein dies; a shank adapted to slide in said tool-holder; a sleeve adapted to surround said head and shank and capable of sliding thereon; a lever pivoted to said tool-holder and connected with said sleeve; and mechanism against which said lever is adapted to come in contact upon the forward movement of said shank, substantially as described.

26. In a screw-machine, the combination with a tool-holder; of a head having dies mounted therein; a shank adapted to slide in said tool-holder; a sleeve surrounding said head and shank and adapted to engage with said dies to force them toward the center; and a spring connecting said shank and tool-holder to draw said head within said sleeve, substantially as described.

27. In a screw-machine, the combination with a tool-holder; of a head having dies mounted therein; a shank connected to said head adapted to slide in said tool-holder; a sleeve surrounding said head and shank capable of sliding thereon, and having a beveled surface to engage with said dies and force the same positively toward the center; a lever pivoted to said tool-holder and connected to said sleeve; a spring forcing said shank inward to draw said head within said sleeve; and mechanism against which said lever is adapted to come in contact upon the forward movement of said shank, substantially as described.

28. In a screw-machine, the combination with a tool-holder; of a head having dies mounted therein; a shank adapted to slide in said tool-holder; a sleeve surrounding said head and shank, and adapted to engage with said dies to force them toward the center; and an arm having a beveled surface against which a lug in said head may come in contact upon the rotation of said tool-holder, substantially as described.

29. In a screw-machine, the combination with the tool-holder; of a shank capable of a longitudinal movement therein; a spring constantly tending to press said shank outward; a forked head to said shank having two carriages dovetailed in the forks thereof to slide transversely; levers pivoted to said head and to said sliding carriages; and beveled blocks against which the ends of said levers are adapted to bear to draw said carriages toward the center when said shank is pressed inward against the tension of said spring, substantially as described.

In witness whereof I have hereunto set my hand this 20th day of May, 1895.

GEORGE G. PRENTICE.

Witnesses:
LORENZ FEIST,
HUGO ROELTGEN.